J. C. BRACKETT.
CONTROLLING MECHANISM FOR MOTOR CARS.
APPLICATION FILED NOV. 30, 1912.

1,198,995.

Patented Sept. 19, 1916.
3 SHEETS—SHEET 1.

WITNESSES

INVENTOR
JOHN C. BRACKETT
BY HIS ATTORNEY

J. C. BRACKETT.
CONTROLLING MECHANISM FOR MOTOR CARS.
APPLICATION FILED NOV. 30, 1912.

1,198,995.

Patented Sept. 19, 1916.
3 SHEETS—SHEET 3.

WITNESSES

INVENTOR
JOHN C. BRACKETT
BY HIS ATTORNEY

UNITED STATES PATENT OFFICE.

JOHN C. BRACKETT, OF COPPER CLIFF, ONTARIO, CANADA.

CONTROLLING MECHANISM FOR MOTOR-CARS.

1,198,995.   Specification of Letters Patent.   Patented Sept. 19, 1916.

Application filed November 30, 1912. Serial No. 734,379.

*To all whom it may concern:*

Be it known that I, JOHN C. BRACKETT, a citizen of the United States, residing in Copper Cliff, Ontario, Canada, have invented certain Improvements in Controlling Mechanism for Motor-Cars, of which the following is a specification.

My invention relates to a system of control particularly adapted to gasolene-engine-driven motor cars, and comprises means whereby the range of car speed is controlled electrically without recourse to shifting of the change gears by hand. By preference, the control of the car is vested in the usual readily accessible and understandable finger levers on the steering wheel with such adventitious aid as may be desired from the foot throttle and the customary braking devices.

Perfect flexibility is the ultimate aim in automobile motor construction. A perfectly flexible engine may be defined as one capable of negotiating all conditions of road and grade without variations of the gear connection between the engine shaft and the axle of the car. This, in a certain degree, has been attained by the development of superior ignition and gas mixing devices and by recent marked advances in valve design, but the fundamental requirement for a light, powerful unit will always have to be met by high speed design, as the unit explosion pressure is limited by many considerations. When road and grade demand high power at low car speed the power must, therefore, be derived from an engine at high speed, geared down to operating requirements by a ratio too low for use during faster travel.

By means of my device, with the car standing and the motor at rest, the throttle control lever may be swung sharply from neutral to reverse, or from neutral to a high forward speed on the high gear, and no further attention given to anything but the steering wheel. The engine may be started and the car picked up smoothly on reverse, or picked up on the first gear forward and carried through to the second and to the high speed or third gear at a rate limited only by the capacity of the motor and by what the car should stand.

My invention represents an advance in the art of motor car control in that, using only the standard spur gears for engine speed reduction, it supplies a means of effecting the automatic shifting of these gears by manipulation of simple levers which, by preference, are those ordinarily used for engine control. The automatic shifting of the gears is preferably accomplished by the use of electric power which may, if desired, be also used for the operation of an electrical self-starter, the precise action of which it will not be necessary here to refer to, as it forms, in itself, no part of this invention.

In the accompanying drawings

Figure 1:
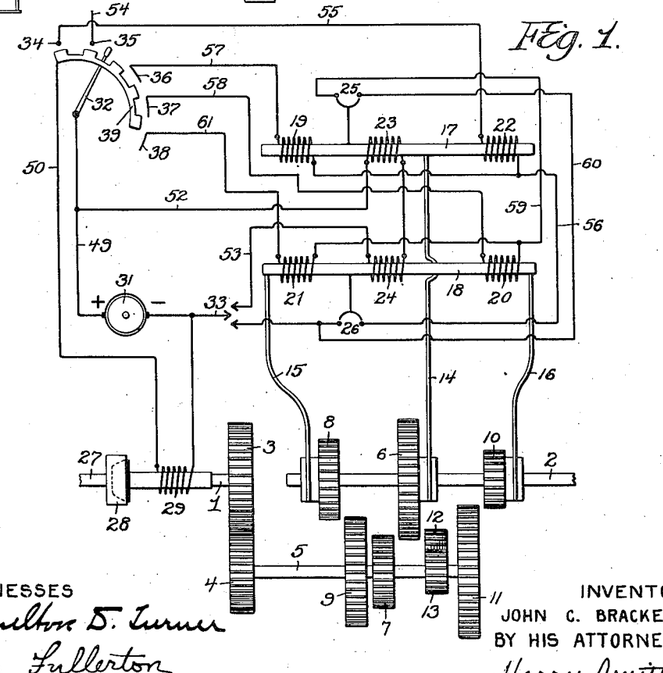
Figure 1 is a diagrammatic representation of an ordinary system of speed-changing gears employed in motor cars, illustrating in connection therewith a system of gear-shifting magnets and controlling electric circuits embodying my invention.

Referring in the first instance to Fig. 1 of the accompanying drawing, I have illustrated an ordinary sliding gear automobile transmission mechanism by means of which the clutch shaft 1 is connected to the car shaft 2 through the medium of counter shaft gears 3 and 4, a counter shaft 5, and reducing trains 6 and 7, 8 and 9, 10 and 11, and 6, 12 and 13, constituting respectively the first or low speed, the second or intermediate speed, the third or high speed, and the reverse gear. The spur wheels of these trains are shifted into and out of mesh by shifter arms 14, 15 and 16 connected to the shifter bars 17 and 18, which can, by means of solenoid magnets 19, 20, 21, 22, 23 and 24, be moved in either direction or maintained in a mid position. The solenoids have their cores secured to the shifter bars in such position that excitation of coil 19 draws the shifter bar 17 to the left, putting the low gear train 6—7 into mesh; excitation of coil 20 draws the shifter bar 18 to the right, putting the second gear train 8—9 into mesh; excitation of coil 21 draws shifter bar 18 to the left, putting the high speed train 10—11 into mesh; excitation of coil 22 draws the shifter bar 17 to the right, putting the reverse gear train 6, 12, 13 into mesh, and excitation of coils 23 and 24 draws the shifter bars 17 and 18, respectively, into their mid positions, putting the various gear trains out of mesh, as illustrated in Fig. 1 of the drawing. In this position of the shifter bars 17 and 18 the brush and toggle contacts 25 and 26 in the electrical circuit shown in Fig. 1 are closed.

The clutch shaft 1 is connected to the engine shaft 27 by the driving clutch 28 which may be operated by the customary clutch pedal on the car, but which is also under control of a solenoid 29.

Power for the operation of the various solenoids is taken from any available source on the car, as, for instance, direct from a small generator geared to the engine (such generator being indicated at 31, in Fig. 1) or from a storage battery charged by such generator. These solenoids are also, by preference operated in conjunction with some form of electrical self-starter for the engine, the latter being controlled by an electrical relay operated in connection with a master switch later to be described. The action of this self-starting device is omitted from this description, since the relation of its controlling relay to certain members of the herein described speed controlling system is the only part of it which is pertinent to this invention. Power distribution to the solenoids is effected through a master switch lever 32 and a contact 33, the latter being closed only when the clutch 28 is opened by the solenoid 29. The master switch lever 32 contacts with terminals 34, 35, 36, 37 and 38 of the electrical circuits hereinafter described and containing the various solenoids 19 to 24, and at each of such contacts makes contact also with a segment 39 forming part of a circuit containing the clutch-actuating solenoid 29.

Figures 3, 4:
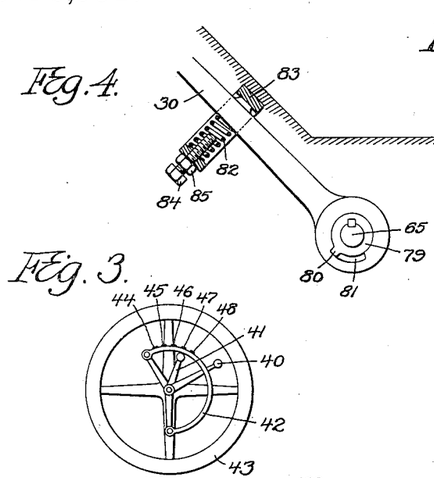
Fig. 3 represents the ordinary steering wheel with the control levers thereon.
Fig. 4 represents a connection between the clutch pedal and the clutch operating shaft.

The master switch lever 32 is actuated by a lever under control of the driver of the car, and, in order to avoid unnecessary multiplication of levers, this lever is, by preference, the engine gas control lever 40 which, as well as the engine spark control lever 41, travels over the control sector 42 located above the steering wheel 43, as shown in Fig. 3. The control sector 42 is marked by flats 44, 45, 46, 47 and 48 corresponding, respectively, to the terminals 34, 35, 36, 37 and 38, these flats being so proportioned as to provide a reasonable amount of resistance to the travel of the lever 40 so as to prevent inadvertent or accidental change in the position of said lever between the intentional changes of such position. If, with the motor at rest, the master switch lever 32 is swung to contact with the terminal 35 a circuit will be completed from the power generator 31 through wire 49, master switch lever 32, segment 39, wire 50, and solenoid 29 back to generator, opening clutch 28. This movement closes contact 33 and completes a circuit from generator 31, through wire 49, wire 52, solenoids 23 and 24, wire 53, and contact 33, back to generator, exciting the two neutral solenoids 23 and 24, and setting all gears at neutral if they have not already been so placed. This position of the master switch lever 32 also directs current through terminal 35 and wire 54 to the self-starter relay and sets the self-starter into action, the self-starter relay being arranged to drop open when the motor picks up its own power. If the motor control lever 40 (Fig. 3) is now thrown to the left to point 44 it throws the master switch lever 32 into contact with the terminal 34, thereby completing a circuit as before from segment 39 through the main clutch coil 29, thus opening the clutch 28 and closing contact 33. At the same time a circuit is completed from the generator 31 through the wire 49, master switch lever 32, terminal 34, wire 55, coil 22, wire 56, contact 26, and contact 33, back to generator, thereby exciting the coil 22, drawing the shifter bar 17 to the right, and putting the reverse gear train 6, 12 and 13 into mesh. Swinging the control lever 40 to the left of point 44 carries the master switch lever 32 to the left of the segment 39, thereby opening the circuit through the coil 29 so as to permit the clutch 28 to close and drive the car backward. When the desired backward travel is reached the clutch may be opened either by means of the clutch pedal of the car, or by moving the control lever 40 to the right over point 44, thus recompleting the circuit through the clutch coil 29 and again opening the clutch, and, if a quick stoppage of the car is required, such stoppage may be effected by means of the ordinary foot brake. Swinging the control lever 40 to the right over point 46 places the master switch lever 32 in contact with the terminal 36, and segment 39, thereby opening the clutch 28 by excitation of the coil 29 and closing the contact 33. This completes a circuit through the wire 52, coils 23 and 24, wire 53 and contact 33, setting all gears at neutral and at the same time it completes a circuit from generator 31 through wire 49, master switch lever 32, terminal 36, wire 57, coil 19, wire 56, contact 26, and contact 33, back to the generator, thereby energizing the coil 19 and moving the shifter bar 17 to the left so as to enmesh the slow speed gear train 6—7. Carrying the control lever 40 past the point 46 to the space between points 46 and 47, breaks the circuit through the coil 29, permits the clutch 28 to close, and runs the car on the low gear.

If it is desired to supply the engine with more gas than is permitted to pass the throttle valve when the control lever 40 is in the position last described, the supply is completed by means of the usual foot throttle or accelerator which opens a by-pass around the main valve.

Moving the control lever 40 to point 47 throws the master switch lever into contact with the terminal 37 and segment 39. This energizes the coil 29, opens the clutch 28, closes the contact 33, and completes the circuit from the generator 31 through the wire 52, coils 23, 24, wire 53, and contact 33, back to the generator, thereby energizing the coils 23 and 24, putting all gears in the neutral position and closing the contact 25. This completes a circuit from the generator 31 through the wire 49, master switch lever 32, terminal 37, wire 58, coil 20, wire 59, contact 25, wire 60 and contact 33, back to the generator, thereby energizing the coil 20, moving the shifter bar 18 to the right and throwing the second speed gear 8—9 into mesh. Moving the control lever 40 into the space between points 47 and 48 removes the master switch lever 32 from the segment 39 and opens the circuit through the coil 29, thereby permitting clutch 28 to close and running the car on the second gear at a speed adjustable by the foot throttle. Moving the control lever 40 into position 48 brings the master switch lever 32 into contact with the terminal 38 and segment 39, thereby completing the circuit through the coil 29, opening the clutch 28, closing the contact 33, and completing a circuit from the generator 31, through the wire 49, master switch lever 32, terminal 38, wire 61, coil 21, wire 59, contact 25, wire 60 and contact 33, back to the generator, thereby exciting the coil 21, drawing the shifter bar 18 to the left and putting the high speed gear 10—11 into mesh. Carrying the control lever 40 to the right past position 48 breaks the circuit through the clutch coil 29 and permits the clutch 28 to close, thereby running the car on the third speed gear. Thereafter the gas supply may, if desired, be controlled entirely by the lever 40.

Figure 2:
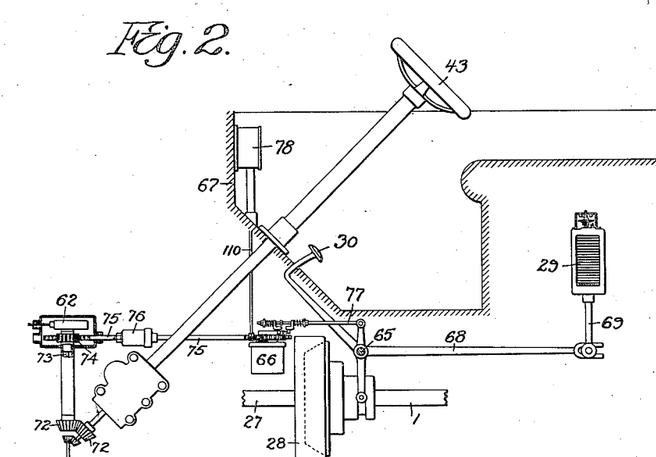
Fig. 2 shows an arrangement which may be adopted for the disposal of control parts in respect to the car.
Figure 5:
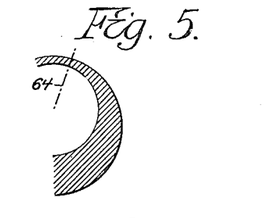
Fig. 5 is a diagram representing the area of throttle opening corresponding to the different positions of the throttle control lever.

The connection between the gas control lever 40 and the carbureter valve may be through a link, crank, cam or other device 62, as shown in Fig. 2, the connection being designed to give gas openings such, for instance, as indicated in the diagram, Fig. 5, which indicates the area of valve opening at different angular positions of the control lever 40. In this diagram the dotted line 64 corresponds to the position of the control lever at the point 48 on the sector 42. Movement of the control lever 40 to the left of this position gives the right amount of gas to supply the engine during the periods in which the main clutch 28 is held open by the solenoid 29, the gas supplied between these periods being regulated by the foot throttle or accelerator, and a suitable connection from the clutch operating shaft closing the by-pass when the clutch is held open by the solenoid 29. This renders unnecessary the changing of the pressure on the foot throttle during acceleration. The control lever shaft is connected by bevel gears 72 to a shaft 73 which carries the throttle controlling cam or equivalent device 62, and is also provided with a spur gear 74 meshing with a rack 75 which operates the master switch lever 32, said rack having a spring section 76 which permits movement of that portion of the rack which engages the gear 74 without necessarily imparting corresponding movement to the master switch lever.

In connection with the master switch lever I employ an escapement or other time element device for retarding the movement of said switch lever but the electrical functions of the control may be effected instead by a system of relays excited from a small dial switch operated by the lever 40 in conjunction with any suitable retarding time element device, and the latter, together with the relays, may be mounted on the dashboard of the car, thus placing the control of the rate of car acceleration in this convenient place, or the gear and clutch solenoids may be connected directly to a primary master switch operated by a control lever 40 at a rate controlled by a small dashpot, mounted on and controlled at the dashboard of the car, or controlled by combining the movement of the master switch with a time element device introduced into the action of the clutch coil 29, either plan having for its object the introduction of an adjustable time element between the possibly hasty movement of the control lever 40 over the low gear positions, and the action of the electrical connections brought about by this motion, so that, for instance, with the car standing and the motor at rest, the control lever 40 may be swung sharply from a neutral position, between points 44 and 45, to a high speed position on the third gear, with the effect that the engine is started and the car picked up on first gear, then taken on to second gear and then to third gear at a rate adjustable to conditions and to the capacity of the car.

Figures 6, 8:
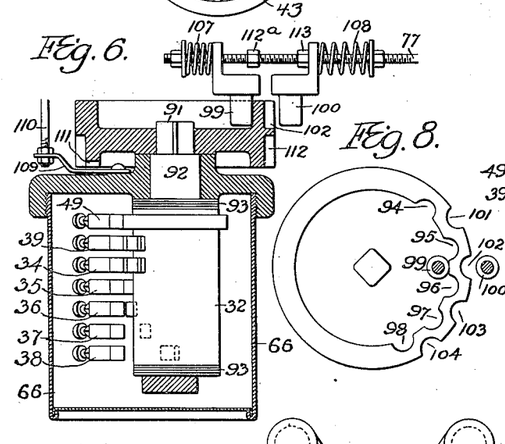
Fig. 6 represents a sectional elevation of the main controlling switch.
Figs. 8 and 9 represent the arrangement of the locking notches and rollers controlling the main switch.
Figure 7:
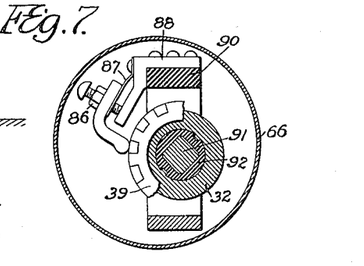
Fig. 7 represents a cross section through the electrical contacts of the main switch.
Figure 9:
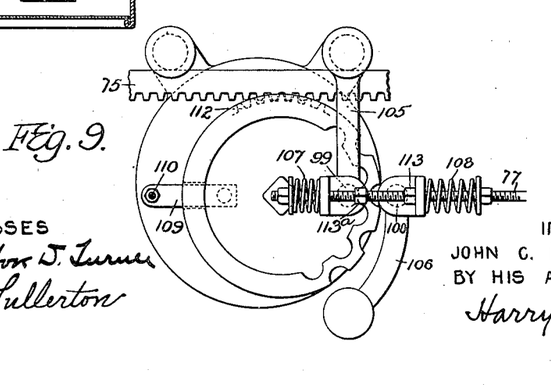

The details of the master switch lever 32 and its controlling escapement are shown in Figs. 6, 8 and 9. The switch lever 32 (Fig. 6) is built in the form of a small controller drum, to which power wire 49, Fig. 1, and contacts 34, 35, 36, 37, 38 and 39 are brought, through control fingers of corresponding numbers, adjusted by screws and locknuts 86, Fig. 7, and mounted by springs 87 on metal connection castings 88 to which the various control leads are brought in any suitable manner. These small connecting castings are screwed to a fiber block 90, which forms part of the controller frame. The controller drum 32 is cast hollow and secured to a squared shaft 91, by means of insulating cement poured into the space shown at 92, as shown in Fig. 7. The controller drum 32 is insulated from its frame by substantial fiber washers as at 93, Fig. 6, and the various controller rings, all interconnected by the drum 32, are arranged as shown in the developed plan, Fig. 10, which also shows the angular relation of the controller rings, and of the controller locking notches 94, 95, 96, 97, and 98 and locking roll 99, of the escapement device, these parts being shown also in Fig. 8, together with the auxiliary roll 100, and mid notches 101, 102, 103 and 104. The locking rolls 99 and 100 are mounted on swinging links 105 and 106 (Fig. 9) and these links are acted upon through the medium of springs 107 and 108 and suitable adjusting nuts and washers, by a link 77 connected to the clutch operating lever 68, as shown in Fig. 2, so that said link 77 will be shifted from right to left by the opening of the clutch 28 by the clutch coil 29. Movement of the control drum 32 is further regulated by a flat spring 109 (Figs. 6 and 9) this spring being lifted by a light rod 110 on the closing of the previously mentioned self started relay, and engaging, when lifted, with a notch 111 in the bottom of a gear 112 which is in mesh with the rack 75 (Figs. 2 and 9) so that, with the self starter relay closed, the gear 112 cannot be rotated by said rack 75.

The controller locking notches 94, 95, 96, 97, and 98 correspond in angular position to the gear distinguishing flats 44, 45, 46, 47 and 48, on the control sector 42 (Fig. 3). This angular relation is further illustrated in developed plan, Fig. 10. When the control lever 40 is over gear distinguishing flat 44 the locking roller 99 is in the plane of the controller locking notch 94, and the wire 49 and contacts 39 and 34 are connected through the master switch drum 32, as indicated in Fig. 1, thereby opening clutch 28 and enmeshing reverse gear train. Placing the control lever 40 over flat 45 rotates the drum 32 so that the locking roller 99 engages the notch 95, and the wire 49 and contacts 39 and 37 are connected, thereby opening the clutch 28 and enmeshing the second gear. Placing the control lever 40 over flat 48 rotates the drum 32 so that locking roller 99 engages the notch 98, and the wire 49 and contacts 39 and 38 are connected, opening the clutch 28 and enmeshing third gear.

The springs 107 and 108 (Fig. 9) are adjusted by locking nuts on the link 77 so that with the clutch 28 closed and the link 77 drawn to the right (see Fig. 2) a pressure is exerted on the link 105, which carries the locking roller 99, tending to force said roller into the notches 94, etc. The locknut 113 is adjusted so that with the link 77 to the right, the link 106 holds the roller 100 clear of the notches 101, etc. The locknut 113ᵃ is set so that motion of the link 77 to the left first compresses the spring 108, pushing the roller 100 toward the notched ring, and then carries the roller 99 clear of the notches 94, etc.

Figure 11:
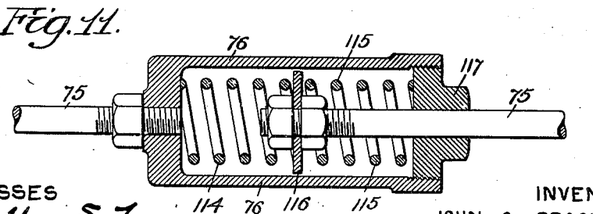
Fig. 11 shows details of the extensor spring in the main switch operating rack.

Fig. 11 shows details of the spring connection 76 in the rack bar 75, Fig. 2. The rack bar 75 is broken at this point and one end terminates in the annular casing 76, and the other in a washer 116, held in place by two locknuts within said casing. Springs 114 and 115 form a yielding connection between the two parts of the rack, these springs being separated by the washer 116 and the compression of the springs being regulated by adjusting the position of said washer 116 and of a screwed gland 117 at one end of the casing 76.

Figure 10:
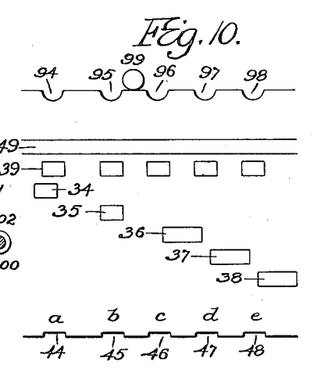
Fig. 10 shows a developed plan of the contacts of the main switch in their relation to the locking notches, and to the successive positions of the control lever.

For convenience, I have, in Fig. 10, lettered the five positions of the master switch $a$, $b$, $c$, $d$ and $e$. With the master switch in position $d$ the controller locking roller 99 sets into the notch 97, and a circuit is completed from the wire 49 to the contacts 39 and 37, which, as earlier described, opens the clutch 28 (Fig. 1) and enmeshes the second gear train. Swinging the control lever 40, Fig. 3, from a neutral position between flats 45 and 46 to the left past flat 44, causes the rack 75, Fig. 2, to tend to move to the right, thereby compressing the spring 114 and moving the master switch lever into position $b$, Fig. 10, at which point the locking roller 99 engages the notch 95 and stops further movement. This position engages the self starter relay 78, Fig. 2, starting the motor and lifting the rod 110, and engaging the spring 109, Fig. 6, in the notch 111 of the gear 112. Position b also opens the clutch 28, Fig. 2, by excitation of the coil 29, and releases the roller 99, Fig. 8, from the notch 95 by reason of the thrust of the link 77, Fig. 9, on the link 105. The master switch drum 32, however, is held in position b until the motor picks up its own power, at which time relay 78 drops, releasing the spring 109 from the notch 111, Fig. 6, and allowing the master switch to reach a position between b and a, where it is held by the roller 100, Fig. 8, engaging the notch 101. This mid position breaks the clutch coil circuit and closes the clutch momentarily, with the gears on neutral. Closure of the clutch shifts the link 77, Fig. 9, to the right, thereby swinging the link 106 to the right, and releasing the roller 100, Fig. 8, from the notch 101 and putting the spring 107, Fig. 9, in compression. The master switch drum 32 is now free to swing to position a where the roller 99 engages the notch 94 and the clutch 28 is opened and the reverse gear enmeshed. Opening of the clutch 28 shifts the link 77, Fig. 9, to the left, releasing the roller 99. This permits the master switch drum 32 to reach a position to the left of a, Fig. 10, breaking connection with the clutch coil 29 and closing the clutch 28, Fig. 2. Thus, a single movement to the left of the throttle lever 40 Fig. 3, suffices to start the motor and pick up the car on reverse gear, running it backward. This backward travel may be stopped by a slight motion of the throttle to the right over flat 44, thereby opening the clutch 28, the assistance of the brake being employed in effecting the stop if required. It will be noted in Fig. 10 that in moving from position a to the left, contact with reverse segment 34 is prolonged after discontinuation of contact with clutch segment 39, leaving the reverse gear in mesh when the clutch closes. In leaving position a to the right, the reverse gear circuit is broken before the clutch is dropped, leaving a circuit complete from the generator 31, Fig 1, through the wires 49 and 52, neutral coils 23 and 24, wire 53 and contact 33, back to the generator, setting the gears on neutral. A similar effect, in reverse order, is secured by the relative positions of segments 36 and 39 in position c. If, from the neutral position between 44 and 45 the control lever 40 is swung sharply to a high speed position on third gear, as shown in Fig. 3, the rack 75 (Fig. 2) will be shifted to the left, compressing the spring 115 (Fig. 11) and tending to rotate the master switch drum 32 anti-clockwise. Upon reaching position b (Fig. 10) the roller 99 engages the notch 95, the clutch 28 is opened, the link 77 is moved to the left, the roller 99 is lifted clear of the notch 95, and, unless impeded by the spring 109 (Fig. 6) connected to the self starter, the master switch advances to a position between b and c, where it is locked by the roller 100 engaging the notch 102. This position closes the clutch 28, which, in turn shifts the link 77, to the right, releasing the roller 100 and compressing the spring 107, thereby leaving the master switch free to reach position c, where it is held by the roller 99 engaging the notch 96, this movement opening the clutch 28 and enmeshing the first gear. Opening the clutch 28 swings the link 77 to the left, releases the roller 99 and compresses the spring 108, permitting the master switch to reach a position between c and d where it is held by the roller 100 engaging the notch 103. This movement closes the clutch 28 and runs the car on low gear. Closing the clutch 28 shifts the link 77 to the right, releasing the roller 100 from the notch 103, and compressing the spring 107, permitting the master switch to reach position d where it is held by the roller 99 engaging the notch 97, this movement opening the clutch 28 and enmeshing the second gear. Opening the clutch 28 shifts the link 77 to the left, releasing the roller 99 and compressing the spring 108, permitting the master switch to reach a position between d and e, where it is held by the roller 100 engaging the notch 104. This movement closes the clutch 28 and runs the car on the second gear. Closing the clutch 28 shifts the link 77 to the right, releasing the roller 100 and compressing the spring 107, permitting the master switch to reach position e, where it is held by the roller 99 engaging the notch 98, thus opening the clutch 28 and enmeshing the third gear. Opening the clutch 28 shifts the link 77 to the left, releasing the roller 99 and permitting the master switch to pass to the right of position e, thereby closing the clutch 28 and running the car on third gear at a rate adjustable by control lever 40, or by the accelerator, as desired. One motion of the control lever, therefore, suffices to start the motor, pick the car up on the first gear, then change to second gear and then to high gear, at a rate limited only by what the car should stand, and adjustable by adjustment of the stroke of clutch coil solenoid 29.

From the third gear the car may be returned to second or to first gear with one motion of the control lever, and speed control then taken by the foot throttle. If, for instance, with the car running on high gear, control lever 40, Fig. 3, is returned to a position between 46 and 47, the rack 75, Fig. 2, will be shifted to the right, compressing the spring 114, Fig. 11, and turning the master switch drum 32 back to position e, Fig. 10, where it is held by the locking roller 99 engaging the notch 98. This position opens the cluth 28, shifting the link 77 to the left, releasing the roll 99 and compressing the spring 108. This permits the master switch to reach a position between e and d, where it is held by the roll 100 engaging the notch 104, this movement enmeshing the second gear and closing the clutch 28. Closing the clutch 28 shifts the link 77 to the right, releasing the roll 100, compressing the spring 107, and permitting the master switch to reach position d, where it is held by the roller 99 engaging the notch 97. This opens the clutch 28 and shifts the link 77 to the left, releasing the roller 99, compressing the spring 108 and permitting the master switch to reach position between d and c, where it is held by the roller 100 engaging the notch 103, this movement enmeshing the first or low speed gear and closing the clutch 28. Closing the clutch 28 releases the roller 100 as before, but the spring 114, Fig. 11, has reached its center position and the master switch has no more tendency to move.

Figure 12:
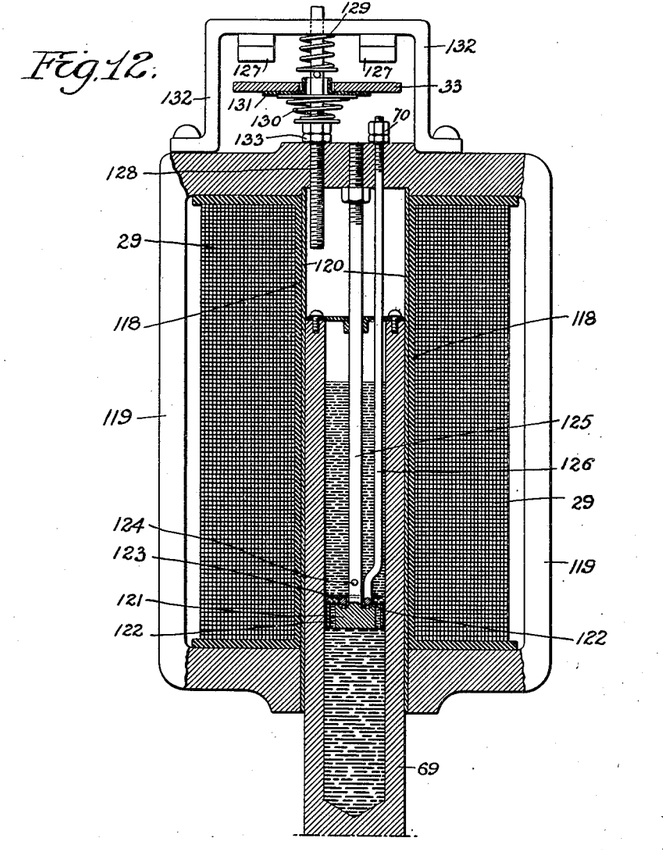
Fig. 12 shows details of the driving clutch operating coil and of a circuit opening and driving contact, operating in conjunction therewith.

Fig. 12 shows details of the clutch coil 29 and contact 33, Fig. 1. The coil 29 is wound on a fiber spool 118, and set in an iron frame or yoke 119, secured by a brass tube 120. A hollow plunger 69 operates over a dash pot piston 121, perforated as at 122, so that with the coil excited and the plunger lifting to open the clutch 28, Fig. 2, the light oil kept in the hollow plunger flows freely through perforations 122, lifting a disk, 123 until it contacts with a stop pin 124 on a rod 125 fixed to the frame 119. This permits rapid opening of the clutch. In closing, however, when the plunger is lowered by the pull of the clutch spring, this oil must flow through the space between the ring 123 and the piston 121 in order to reach the perforations 122. This retards the closing action, closing the switch gently, and at a rate adjustable by manipulation of the distance between the disk 123 and piston 121, by means of the adjusting rod 126 and locknut 70.

Contact 33 comprises a copper disk 33 making connection with two carbon contacts 127, when the rod 128 is lifted by the action of the plunger 69. The rod 128 is held down by a spring 129, and a firm contact between the disk 33 and contacts 127 is secured by a spring 130. The disk 33 is insulated from the surrounding metal by a substantial fiber washer 131 and the contacts 127 are mounted on a fiber frame 132.

The interval between the opening of the clutch and the enmeshing of the gears is timed by adjusting the position of the disk 33 on the rod 128, by means of a locknut 133, thereby permitting more or less of the rod 128 to protrude into the chamber space above the plunger 69. The period of closed clutch acceleration between gear changes is regulated by adjusting the point of full closure of the clutch 28 to various positions, permitting a greater or less amount of travel downward of the plunger 69 between full clutch closure and the downward limit of the plunger stroke. This may be adjusted either by varying the angle at which the lever 68, Fig. 2, is connected to the clutch operating shaft 65, or by varying the connection between the shaft 65 and the clutch 28. In either case, the locknut 113 on the link 77 (Fig. 9) is adjusted to release the locking roll 100 at the end of the down stroke of the plunger 69, rather than at the point of clutch closure.

Fig. 4 shows the manner of connecting the clutch pedal 30 to the clutch operating shaft 65. The ring 79 is connected to the shaft 65, this ring having a stop lug 80 which is contained in a segmental slot 81 in the hub of the clutch pedal 30, whereby the clutch may be opened by the lever 68 (Fig. 2) without moving the clutch pedal 30, the latter being held in place by a spring 82 which holds the pedal against a stop 83. Downward movement of the clutch pedal 30 is limited by an adjusting screw 84 and locknut 85 so set that the maximum movement of the clutch pedal is not quite sufficient to close the contact 33, which may be located in the master switch case 66 or at the clutch coil 29. The lever 68 is fastened directly to the clutch operating shaft 65.

While I have shown and described electrically-operated means for operating the clutch and the gear shifting devices my invention in its broader aspect is not limited thereto, as power other than electrical power may be utilized for this purpose; for instance, the clutch and the gear shifting mechanism may be actuated by fluid under pressure, flow of the same being controlled by electrically-operated valves, and while I use the term "lever" to indicate the means whereby such power-actuated devices are controlled this is merely for convenience, and not intended to imply that the mechanical device known as a lever must always be employed, nor is my invention limited to the use of the power controlling lever 40 as the primary element of the control device, since it is evident that an independent lever might be used, nor is it necessary that such primary element of the controlling device should be mounted upon the steering column, as the dashboard or other portion of the vehicle structure may be utilized for this purpose, the only thing which is essential in this respect being that the said primary element of the controlling device shall be within convenient reach of the driver of the car.

I claim:

1. The combination, in a vehicle propelling device, of a driving shaft, a driven shaft, a clutch and gearing for connecting said driving and driven shafts, and interdependent electromagnetic devices for the successive manipulation of the said clutch and gears.

2. The combination, in a vehicle propelling device, of a driving shaft, a driven shaft, a clutch and gearing for connecting said shafts, a control lever, a clutch operating device, and gear shifting means concomitantly controlled by said lever and by the clutch operating devices.

3. The combination, in a vehicle propelling device, of a driving shaft, a driven shaft, a clutch, sets of gearing interposed between said driving and driven shafts, a control lever, and electromagnetic devices governed thereby for first opening the clutch and subsequently effecting change in the gear relations between the driving and driven shafts.

4. The combination, in a vehicle propelling device, of a driving shaft, a driven shaft, a clutch interposed between said driving and driven shafts, a control lever, and power mechanism governed by said control lever and serving to open said clutch.

5. The combination, in a vehicle propelling device, of a driving shaft, a driven shaft, a clutch and gearing interposed between said shafts, said gearing being adapted to vary the speed of the driven shaft in respect to that of the driving shaft, a control lever, and electromagnetic power mechanism governed thereby and serving to open the clutch and to shift the gearing in order to effect the desired changes in the speed of the driven shaft.

6. The combination, in a vehicle propelling device, of a driving shaft, a driven shaft, a clutch and gearing interposed between said shafts, said gearing being constructed to vary the speed of the driven shaft in respect to that of the driving shaft, a control lever, and electromagnetic power mechanism governed thereby and serving to first open the clutch, then to effect the desired adjustment of the speed control gears, and then to permit the clutch to close.

7. The combination, in a vehicle propelling device, of a driving shaft, a driven shaft, a clutch and gearing interposed between said shafts, said gearing being adapted to vary the speed of the driven shaft in respect to that of the driving shaft, a control lever, and electro-magnetic devices governed thereby and serving to open the clutch and to shift the gearing in order to effect the desired changes in the speed of the driven shaft.

8. The combination, in a vehicle propelling device, of a driving shaft, a driven shaft, a clutch and gearing interposed between said shafts, said gearing being constructed to vary the speed of the driven shaft in respect to that of the driving shaft, a control lever, and electro-magnetic devices governed thereby and serving to first open the clutch, then to effect the shifting of the speed control gears, and then to permit the clutch to close.

9. The combination, in a vehicle propelling device, of a driving shaft, a driven shaft, a system of variable speed transmission gears interposed between said shafts, a control lever, and electro-magnetic devices governed thereby and serving to effect step by step change from one set of transmission gears to another by shifting of the gears.

10. The combination, in a vehicle propelling device, of a driving shaft, a driven shaft, transmitting mechanism interposed between said shafts, a supporting column and a control lever mounted thereon, and power-actuated means governed thereby and controlling the transmission mechanism between the driving and driven shafts.

11. The combination, in a vehicle propelling device, of a driving shaft, a driven shaft, transmission mechanism interposed between said shafts, electro-magnetic devices for adjusting said transmission mechanism, a switch for governing the operation of said electro-magnetic devices, a power control lever and a lever movable therewith and serving to govern the opening and closing of the circuits of the electromagnetic devices for adjusting the transmission mechanism.

12. The combination, in a vehicle propelling device, of a driving shaft, a driven shaft, a system of gears interposed between said shafts and serving to vary the speed of the driven shaft in respect to that of the driving shaft, power-mechanism for shifting said gears by a step by step movement, and a time element device for regulating the interval between the successive movements.

13. The combination, in a vehicle propelling device, of a driving shaft, a driven shaft, a clutch and a system of gears interposed between said shafts, said gearing serving to vary the speed of the driven shaft in respect to that of the driving shaft, power mechanism for controlling both the clutch and the gears, and a time element device for regulating the interval between the adjustment of the clutch and the adjustment of the gears.

14. The combination, in a vehicle propelling device, of a driving shaft, a driven shaft, transmission mechanism interposed between them, electro-magnetic means for controlling the operation of said transmission mechanism, a controlling switch for said electro-magnets, means whereby power is applied to said switch to move the same, and an escapement for regulating such movement.

15. The combination, in a vehicle propelling device, of a driving shaft, a driven shaft, transmission mechanism interposed between said shafts, and including a clutch and gearing, electro-magnetic means for controlling the operation of said clutch and gearing, a controlling switch for said electro-magnets, means whereby power is applied to said switch to move the same, an escapement for regulating such movement, and means whereby said escapement is actuated by the clutch-operating mechanism.

In testimony whereof, I have signed my name to this specification, in the presence of two subscribing witnesses.

JOHN C. BRACKETT.

Witnesses:
J. J. NICHOL,
JENNIE M. IRVING.